(12) United States Patent
Baumer et al.

(10) Patent No.: US 9,180,749 B2
(45) Date of Patent: Nov. 10, 2015

(54) TWIST BEAM AXLE

(75) Inventors: Benjamin Baumer, Ibbenburen (DE); Christoph Elbers, Stemwede (DE); Jens Eismann, Melle (DE); Dirk Adamczyk, Lemforde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/235,508

(22) PCT Filed: Jun. 27, 2012

(86) PCT No.: PCT/EP2012/062395
§ 371 (c)(1),
(2), (4) Date: Feb. 6, 2014

(87) PCT Pub. No.: WO2013/013918
PCT Pub. Date: Jan. 31, 2013

(65) Prior Publication Data
US 2014/0151973 A1 Jun. 5, 2014

(30) Foreign Application Priority Data
Jul. 28, 2011 (DE) .......................... 10 2011 079 979

(51) Int. Cl.
*B60G 21/05* (2006.01)
*B60G 11/18* (2006.01)
(Continued)

(52) U.S. Cl.
CPC ............ *B60G 21/051* (2013.01); *B60B 35/007* (2013.01); *B60B 35/02* (2013.01);
(Continued)

(58) Field of Classification Search
CPC ...... B60G 21/051; B60G 9/04; B60G 11/189; B60G 11/20; B60G 35/007; B60G 35/02; B60G 2206/20; B60G 2206/427

USPC ................... 280/124.106, 124.111, 124.116, 280/124.117; 29/897, 897.2
See application file for complete search history.

(56) References Cited

U.S. PATENT DOCUMENTS 4,165,099 A * 8/1979 Wagner et al. .......... 280/124.116
4,232,881 A * 11/1980 Kolbel et al. .......... 280/124.128
(Continued)

FOREIGN PATENT DOCUMENTS

DE 295 03 814 U1 6/1995
DE 44 459 95 C1 4/1996
(Continued)

OTHER PUBLICATIONS

German Search Report Corresponding to 10 2011 079 979.6 mailed May 14, 2012.
(Continued)

*Primary Examiner* — Paul N Dickson
*Assistant Examiner* — Timothy Wilhelm
(74) *Attorney, Agent, or Firm* — Davis & Bujold, P.L.L.C.; Michael J. Bujold

(57) ABSTRACT

A twist beam axle for a wheel suspension of a motor vehicle. The twist beam axle has two trailing arms and a torsional profile having prismatic-shaped end sections with a noncircular cross-section. One trailing arm is connected to one torsional profile end section in each case. The trailing arms have a receiving recess having a shape corresponding to that of the outer surface of the torsional profile end section. An inwardly pressed plug is disposed in the interior of each torsional profile end section. The twist beam axle ensures permanent transfers high bending moments and torques between the trailing arms and the torsional profile without a welded joint. Different classes of materials can be used for the torsional profile and trailing arms, or can be connected to one another. The twist beam axle generally makes it possible to use large-volume, thin-walled and, therefore, weight-saving torsional profiles.

18 Claims, 8 Drawing Sheets

(51) Int. Cl.
*B60G 11/20* (2006.01)
*B60B 35/00* (2006.01)
*B60B 35/02* (2006.01)

(52) U.S. Cl.
CPC ............ *B60G 11/189* (2013.01); *B60G 11/20* (2013.01); *B60G 2204/1226* (2013.01); *B60G 2204/44* (2013.01); *B60G 2206/20* (2013.01); *B60G 2206/201* (2013.01); *B60G 2206/202* (2013.01); *B60G 2206/427* (2013.01)

(56) References Cited

U.S. PATENT DOCUMENTS

| | | | | |
|---|---|---|---|---|
| 4,234,205 | A * | 11/1980 | Thiesce | 280/124.107 |
| 4,623,164 | A * | 11/1986 | Cassel et al. | 280/124.106 |
| 4,951,962 | A * | 8/1990 | Tomida et al. | 280/124.108 |
| 5,639,110 | A * | 6/1997 | Pierce et al. | 280/124.116 |
| 5,820,156 | A * | 10/1998 | VanDenberg | 280/676 |
| 6,059,314 | A * | 5/2000 | Streubel et al. | 280/798 |
| 6,086,162 | A * | 7/2000 | Pinch et al. | 301/124.1 |
| 6,099,084 | A | 8/2000 | Bungarten et al. | |
| 6,299,259 | B1 * | 10/2001 | MacKarvich | 301/127 |
| 6,523,841 | B2 * | 2/2003 | Glaser et al. | 280/124.106 |
| 6,702,308 | B2 * | 3/2004 | Yamaguchi | 280/124.166 |
| 6,708,994 | B2 * | 3/2004 | Etzold | 280/124.106 |
| 6,810,586 | B1 * | 11/2004 | Waaler et al. | 29/897.2 |
| 6,829,826 | B2 * | 12/2004 | Herzig | 29/897.2 |
| 7,204,498 | B2 * | 4/2007 | Alesso et al. | 280/124.106 |
| 7,566,063 | B2 * | 7/2009 | Oki et al. | 280/124.106 |
| 7,744,103 | B2 | 6/2010 | Gercke et al. | |
| 8,424,890 | B2 | 4/2013 | Eismann et al. | |
| 8,496,258 | B2 * | 7/2013 | Werner et al. | 280/124.116 |

FOREIGN PATENT DOCUMENTS

| | | |
|---|---|---|
| DE | 196 03 764 A1 | 8/1997 |
| DE | 10 2005 056 878 A1 | 7/2007 |
| DE | 10 2008 049 940 A1 | 4/2010 |
| EP | 0 774 369 A1 | 5/1997 |
| EP | 1 314 587 A2 | 5/2003 |
| JP | 2005-262903 A | 9/2005 |
| WO | 2011/147411 A2 | 12/2011 |

OTHER PUBLICATIONS

International Search Report Corresponding to PCT/EP2012/062395 mailed Sep. 6, 2012.
Written Opinion Corresponding to PCT/EP2012/062395 mailed Sep. 6, 2012.

* cited by examiner

TWIST BEAM AXLE

This application is a National Stage completion of PCT/EP2012/062395 filed Jun. 27, 2012, which claims priority from German patent application serial no. 10 2011 079 979.6 filed Jul. 28, 2011.

FIELD OF THE INVENTION

The invention relates to a twist beam axle for a wheel suspension of a motor vehicle.

BACKGROUND OF THE INVENTION

Twist beam axles of the type in question, which comprise trailing arms and a torsional profile connecting the trailing arms, are used for the suspension and wheel guidance of the rear wheels of motor vehicles. Twist beam axles have the advantage, in particular, of a simple, weight- and cost-saving design, wherein, in most cases, no additional assemblies other the trailing arms and the torsional profile are required for the wheel guidance, in particular eliminating the need for additional suspension arms. The need for an additional anti-roll stabilizer is also usually eliminated, since the function thereof is also performed by the twist beam axle.

Twist beam axles require, in particular, a fixed or rotationally fixed and loadable connection between the rigid trailing arms and the relatively soft torsional profile, which undergoes considerable twisting in the event of a unilateral spring compression of a wheel or rolling motions of the auto body. In addition, the trailing arms and the torsional profile are produced, in part, of different materials, for example of cast iron (trailing arms) or sheet steel (torsional profile).

The connection between the torsional profile and the trailing arms in twist beam axles of the type in question, which are known from EP 1 314 587 A2, for example, is typically produced by means of a welded joint. If dissimilar materials are used, however, such as cast iron and sheet steel, for example, conventional welding methods cannot be used.

In fact, the pair of materials "cast iron/sheet steel" requires special welding methods (e.g. laser welding or the Magnetarc process) and weld seam post-treatment in order to alleviate material stresses produced by welding. In order to achieve high-quality laser welding nonetheless, conventional additives and a welding process having a slow advancing speed in a protective-gas atmosphere are required. The welding machines are therefore associated with high costs and require much handling time. Moreover, laser welding with a filler material (which is typically fed in wire form) is a process that is difficult to master. In addition, in the case of cast iron with spheroidal graphite, ledeburite forms in the fusion phase. The structural constituent ledeburite constitutes an unacceptable risk for welded joints of safety-relevant parts, and therefore cannot be used for axle components.

The likewise known "Magnetarc process" (welding using an arc that is moved magnetically), is suited, in principle, for welding safety-relevant parts, since all the ledeburite formed in the fusion process is pressed out of the joining zone and into the weld bead when the components are pressed at the end of the welding process. In this case, however, post-treatment of the weld seam by means of brief tempering is required for the reformation of (unacceptable) martensite. Since the arc is preferably guided in a circle, this joining process is also suited only for certain closed contours. Furthermore, industrial applications of the Magnetarc process are limited to iron-containing components having a wall thickness of less than 6 mm.

Another general aspect of welded joints is that the structural and material properties of the weld seam are typically lower than the corresponding properties of the welded structural components. At the same time, the location of the welded joint is usually subjected to the greatest loads (this applies, in particular, for the combination of the very stiff trailing arms with the torsionally weak cross-profile in a twist beam axle). For these reasons, the weld seams on a twist beam axle are particularly critical with respect to the endurance limit, which is why the quality of the weld seams usually must be inspected, at least by means of random sampling, by means of x-ray examination or using destructive methods. Other paired materials, however—such as light metal and steel or aluminum and fiber-composite materials—cannot be welded together at all, and so, in this case, new ways of connecting the trailing arms to the torsional profile must be investigated.

SUMMARY OF THE INVENTION

Proceeding therefrom, the problem addressed by the present invention is that of creating a twist beam axle (torsion beam axle), with which the aforementioned limitations of the prior art are overcome. In particular, the twist beam axle shall comprise a reliable and permanently fixed connection between the trailing arms and the torsional profile, wherein it shall also be possible to use different classes of materials for the trailing arms and the torsional profile.

The twist beam axle comprises two trailing arms and one torsional profile, wherein the torsional profile has a noncircular cross-section, at least in the region of the end sections thereof. Each of the two trailing arms is connected to one of the two end sections of the torsional profile. The end section can have a prismatic shape, such that, in other words, the end sections have a cross-sectional shape that is substantially constant along the length thereof.

The twist beam axle is characterized in that the respective trailing arm includes a receiving recess having a shape corresponding to that of the outer surface of the torsional profile end section. A press-fit plug, which is pressed in inwardly relative to the longitudinal extension of the torsional profile, is disposed in the interior space of the torsional profile end section.

This means, in other words, that a welded joint between the trailing arms and the torsional profile can be eliminated entirely, since the connection between the trailing arms and the torsional profile according to the invention is produced by means of a press-fit connection. Due to the press-fit connection, the forces between the trailing arms and the torsional profile, in particular the considerable torsional moments occurring in a twist beam axle, are no longer transferred by means of a bonded connection via weld seams, but rather by means of a form-locked connection via the noncircular cross-sections of the end sections of the torsional profile and via the receiving recesses of the trailing arms, which have a shape corresponding to that of the end sections of the torsional profile.

Due to the use of a press-fit plug, which—in terms of simple assembly of the torsional profile and the trailing arms—is pressed inwardly from the respective end of the torsional profile into the end section of the torsional profile without additional fastening means, it is also possible to connect relatively thin-walled torsional profiles or hollow shafts to the trailing arms without the risk—that may occur in the event of a high load being applied to the connection—that the press fit of the torsional profile in the recess of the trailing arm will fail, and/or that the wall of the torsional profile will fail in the region of connection to the connection between the trailing arms and the torsional profile. This is due to the fact that the press-fit plug supports the wall of the torsional profile in the region of connection to the trailing arm and presses against the inner surface of the recess of the trailing arm, and therefore surface pressure or an interference fit sets in, not only between the press-fit plug and the torsional profile, but also between the outer surface of the torsional profile and the inner surface of the recess of the trailing arm.

Due to the invention, it is therefore possible to not only transfer greater forces and torques between the trailing arms and the torsional profile in a permanently reliable manner, but to also increase the diameter of the torsional profiles used, while optionally reducing the wall thickness thereof at the same time, which can be utilized to advantageously reduce weight in the sense of the lightweight construction on the vehicle. Due to the elimination of the welded joint between the torsional profile and the trailing arms, unwanted structural changes are also prevented in the region of the connection between the torsional profile and the trailing arms, a corrosion-inhibiting post-treatment of the region of connection between the torsional profile and the trailing arms can be eliminated, and, in contrast to the welded joint, which can only be inspected by means of random sampling, 100% quality control is made possible in this case, for example in that the press forces applied in order to press in the press-fit plug can be measured and compared with a setpoint value.

Furthermore, the invention also makes it possible to connect trailing arms and torsional profiles made of highly diverse materials to one another in a relatively problem-free manner, which is also provided according to a preferred embodiment of the invention. Examples of preferred embodiments of such twist beam axles made possible by the invention comprise the combination of trailing arms made of cast iron or light metal having torsional profiles made of sheet steel, or the combination of torsional profiles made of fiber-composite materials having trailing arms made of cast aluminum, for example.

In terms of the implementation of the invention, the cross-sectional shape of the outer circumference of the torsional profile end section and the associated recess of the trailing arm are initially inconsequential, provided this cross-section is noncircular in order to ensure the reliable transfer of torque.

According to a preferred embodiment of the invention, the trailing arm receiving recess and the torsional profile end sections each comprise a polygonal cross-sectional shape having rounded corners. In this manner, high torques can be transferred between the trailing arm and the torsional profile, while, simultaneously, the notch effect at the corners of the polygonal cross-sectional shape of the trailing arm recess and the torsional profile end section is reduced and therefore, the torque that can be transferred over the long term without causing damage is increased.

According to a further preferred embodiment of the invention, the cross-sectional shape of the torsional profile and the trailing arm in the connection region is designed as an orbiform. An orbiform is a closed continuous line forming a shape which, in every position of rotation thereof within an imaginary square, always touches all four sides of the square, similar to a circle inscribed in the square. As is the case with a circle, the form always has the same diameter, regardless of where this diameter is determined. As the applicant has recognized, the orbiform, as the cross-sectional shape of the torsional profile end section and the trailing arm recess, is a particularly effective compromise between the polygon having an optimal form-locked connection but a high notch effect, and the circular cross-section without a form-locked connection and without a notch effect.

Independently of the specific configuration and cross-sectional shape of the press-fit plug, the invention ensures, in particular, that the torsional profile end sections, which may have thin walls, do not collapse (due to the introduced torques) as a result of the walls of the torsional profile being pressed outwardly by the press-fit plug. It is therefore feasible to use a press-fit plug having a substantially circular cross section—even in the case, for example, of a substantially polygonal cross-sectional shape of the torsional profile and the recess of the trailing arm in the connection region—since this also supports the wall, at least in regions, and presses against the inner surface of the recess of the trailing arm, Preferably, however, the outer cross-section of the press-fit plug is designed having a shape that corresponds to that of the inner cross-sectional shape of the torsional profile end section in the region of connection to the trailing arm. As a result, the pressure between the press-fit plug and the torsional profile is applied around the entire circumference of the torsional profile end section, and high torques are effectively and reliably transferred between the trailing arm and the torsional profile.

According to a further preferred embodiment of the invention, the torsional profile has a slot extending in the axial direction of the torsional profile, at least in the region of the end sections thereof. This embodiment makes it possible to use torsional profiles that are open, either in part or entirely, in the longitudinal direction, and that, in particular, can be produced at lower cost than closed torsional profiles, wherein these torsional profiles must be solid-drawn or closed by means of a weld seam. When the outer cross-sectional shape of the press-fit plug matches the inner cross-sectional shape of the torsional profile end section, in particular, a connection between the trailing arm and the torsional profile is obtained that is also rigid and transfers torque, as is the case with embodiment having torsional profiles that are completely (or in the region of the end sections) closed.

Further preferred embodiments of the invention relate to a torsional profile that is also open, at least in the end section. In these embodiments, the torsional profile is designed to be open along a portion of the circumference thereof, while the press-fit plug extends through the open cross-sectional region of the torsional profile with a sub-region of the outer circumference thereof, or fills this open cross-sectional region of the torsional profile completely and in a form-locking manner, As a result, the press-fit plug itself comes to bear—via the aforementioned sub-region of the outer circumference thereof—directly against the inner surface of the receiving recess of the trailing arm.

As a result of the aforementioned embodiments, even torsional profiles, in particular, that are open completely (along the entire length) can be connected in a fixed and form-locking manner, as is the case with closed torsional profiles. Torsional profiles can therefore be used, for example, that have a substantially continuous "U" or "V" shape. Such torsional profiles can not only be produced at low cost (by being cut into sections, for example), but are also relatively torsionally weak and, simultaneously, relatively flexurally rigid, which is a combination of properties that is often required in twist beam axles.

According to a further preferred embodiment of the invention, the press-fit plug and the recess of the trailing arm in the region of connection between the trailing arm and the torsional profile taper, slightly conically, in the axial direction of the torsional profile. As a result, when the press-fit plug is pressed in, even greater surface pressures are easily obtained between the press-fit plug, the torsional profile, and the recess of the trailing arm.

It is thereby possible to reliably transfer greater torques, and the resistance of the torsional profile to being withdrawn from the recess in the trailing arm is increased, since the press-fit plug distends the previously prismatic end section of the torsional profile when pressed in and thereby presses against the inner contour of the trailing arm, which tapers conically in the axial direction In respect of this embodiment, the expression "slightly conically" is intended to mean that it is generally ensured that the press-fit plug, which is conical in this case, will undergo self-locking in the likewise conical receiving recess of the trailing arm, thereby ensuring that the press-fit plug cannot work its way out of the receiving recess under the effect of operating loads, for example. As a result, separate fixation or fastening of the conical press-fit plug can also be omitted.

According to a further preferred embodiment of the invention, the press-fit plug is hollow or has a recess along the axial direction thereof. This reduces the weight of the press-fit plug. This also improves the course of the lines of force, in particular in the region of the axial end of the press-fit plug in the interior (near the torsional profile) in the assembled state, due to the wall-thickness changes—which are less abrupt here—at the point at which the torsional profile enters the press-fit connection.

According to a further preferred embodiment of the invention, an additional torsion bar is disposed in the interior space of the torsional profile. In this case, the two ends of the torsion bar are connected to the two press-fit plugs of the twist beam axle. As a result of this embodiment, the twist beam axle can be adapted, particularly flexibly and precisely, to the particular requirements of the chassis, in particular since the properties "flexural rigidity" and "torsional compliance" of the twist beam axle can be defined largely independently of one another. It is thereby also made possible—merely by swapping out or using torsion bars having different stiffnesses—to obtain twist beam axles having varying extents of anti-roll stabilization, without the need to make any other structural or component-related changes to the twist beam axle.

BRIEF DESCRIPTION OF THE DRAWINGS

The invention is explained below in greater detail with reference to drawings that merely depict examples of embodiments. In the drawings.

DETAILED DESCRIPTION OF THE PREFERRED EMBODIMENTS

Figure 1:
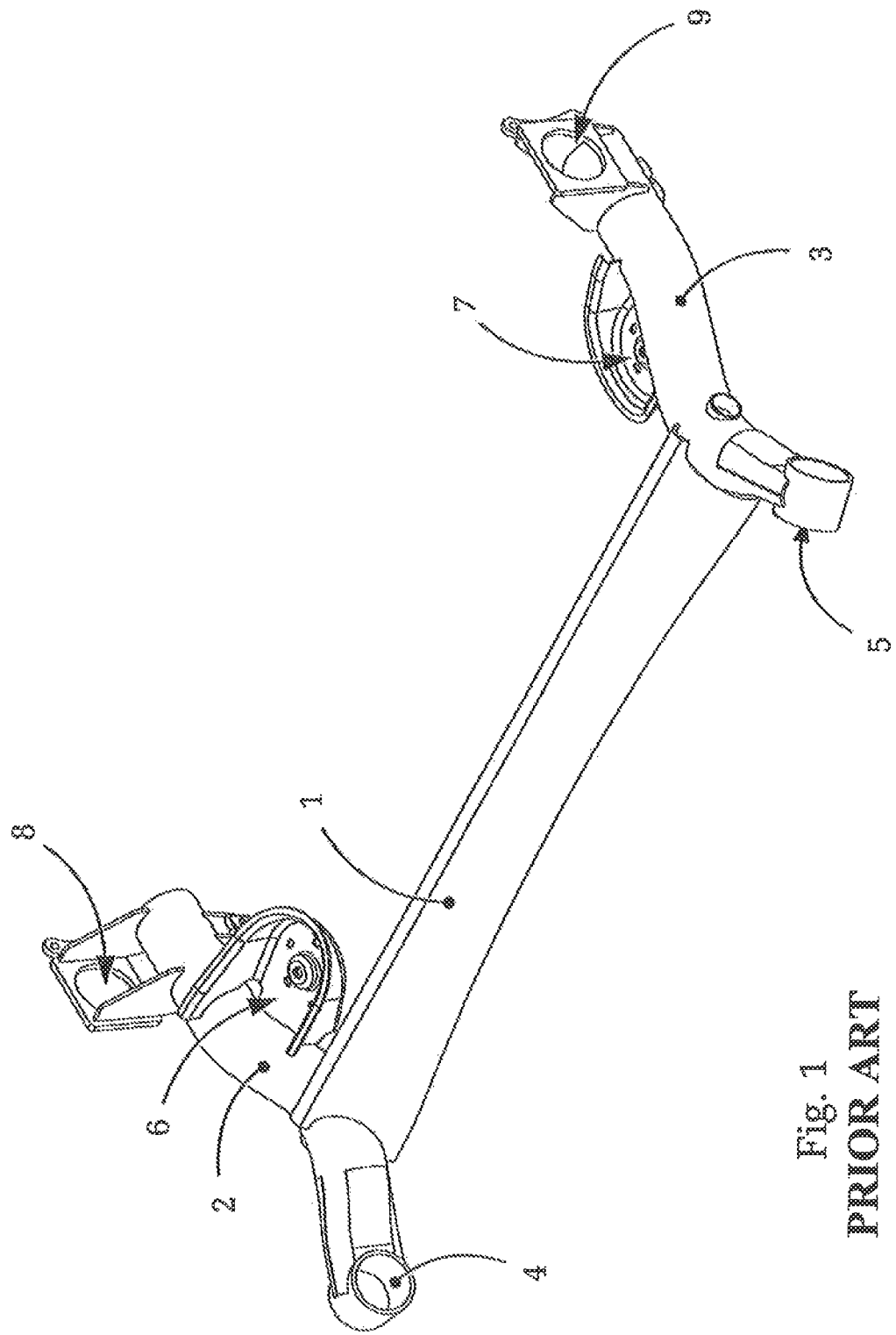
FIG. 1: shows, in an isometric representation, a twist beam axle according to the prior art.

FIG. 1 shows a twist beam axle of the type known from the prior art. Clearly shown is a torsional profile 1, which is produced from sheet steel and is connected to two trailing arms 2, 3, which are produced from bent steel tubes. The trailing arms 2, 3 comprise bearing lugs 4, 5, respectively, for accommodating (non-illustrated) elastomeric bearings for connection to the vehicle chassis or the body, and, furthermore, recesses 6, 7, respectively, for the chassis springs and recesses 8, 9, respectively, for the wheel bearings.

The trailing arms 2, 3 in twist beam axles are basically highly torsionally and flexurally rigid in order to ensure the required wheel guidance, while the torsional profile 1 connecting the trailing arms 2, 3 is designed to be flexurally rigid but torsionally weak. As a result—by means of the connection of the two trailing arms 2, 3 via the torsional profile 1—stable lateral wheel guidance is ensured, while limited, unilateral spring compression of the axle (accompanied by twisting of the torsional profile 1) or anti-roll stabilization of the vehicle is made possible. In the prior art, the trailing arms 2, 3 are usually welded to the torsional profile 1, which is accompanied by the initially mentioned limitations in production and material selection, and the additional expenditures that were also mentioned.

Figure 2:
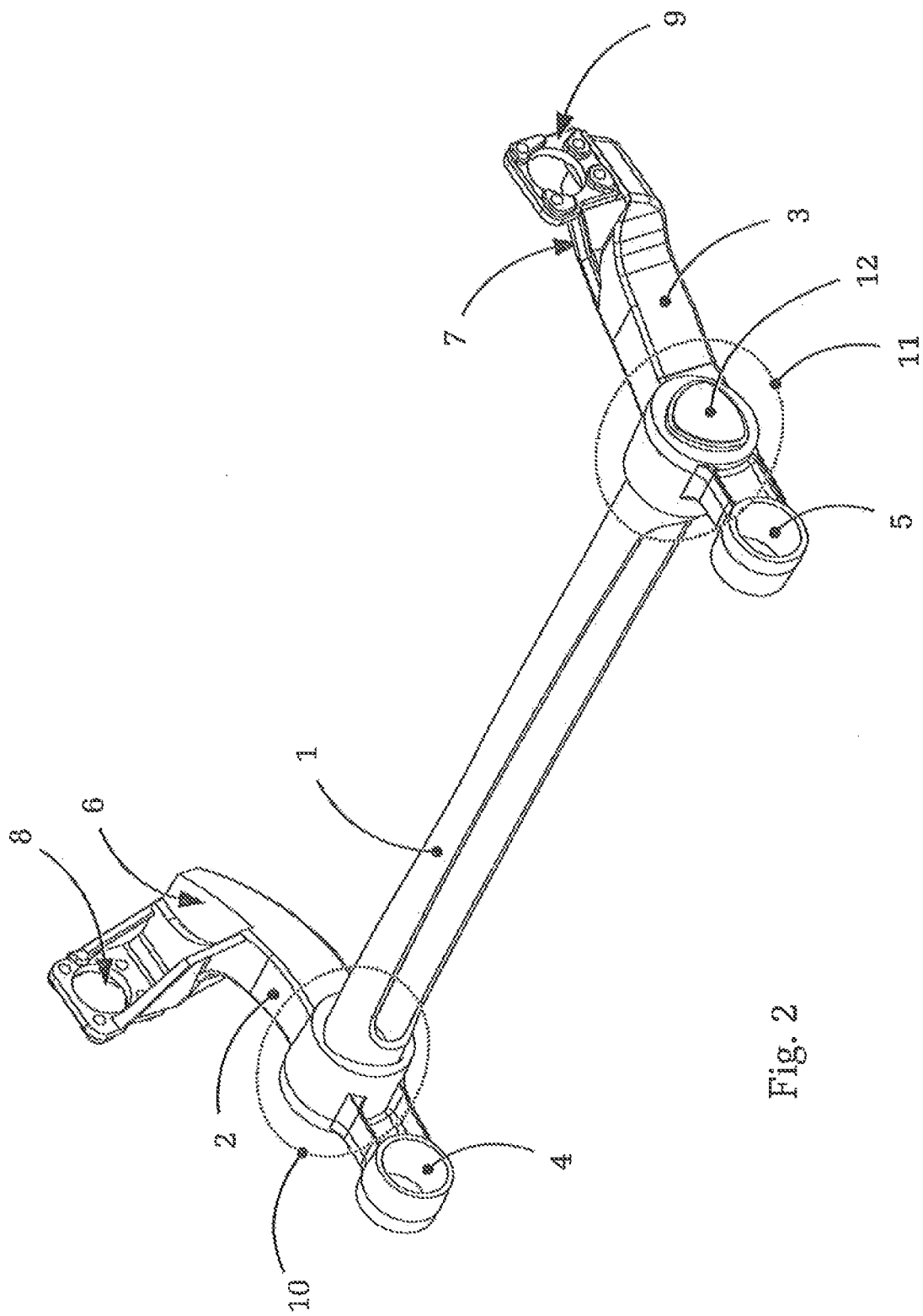
FIG. 2: shows, in a representation corresponding to FIG. 1, a twist beam axle according to one embodiment of the present invention.

FIG. 2 shows a twist beam axle according to one embodiment of the present invention. Clearly shown is a torsional profile 1 and two trailing arms 2, 3 having recesses 4 to 9, and, so far, is similar to the twist beam axle according to FIG. 1, wherein the torsional profile 1 in the embodiment according to FIG. 2 is designed as a type of hollow shaft having an open profile cross-section in the torsional region between the two trailing arms 2, 3 (in order to reduce the torsional stiffness).

In the twist beam axle according to FIG. 2, the trailing arms 2, 3 are not welded to the torsional profile 1, as is the case with the twist beam axle from the prior art according to FIG. 1. Instead, the connection between the torsional profile 1 and the trailing arms 2, 3 in the twist beam axle according to FIG. 2 is established merely by means of a force-locking and form-locking connection in the connection regions 10, 11 between the torsional profile 1 and the trailing arms 2, 3.

To this end, the trailing arms 2, 3 comprise, in the connection regions 10, 11, substantially prismatic recesses, which accommodate, in a form-locking manner, the two end sections of the torsional profile 1, which have a shape corresponding to these substantially prismatic recesses. In addition, a press-fit plug 12 is disposed in the interior space of each of the end sections of the torsional profile 1, which establishes a press fit between the outer wall of the torsional profile 1 in the connection region 10, 11 and the respectively associated recess of the trailing arm 2, 3.

Figure 3A:
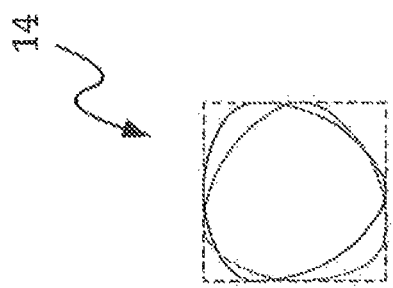
FIGS. 3 and 3A: show, in a side view, the region of connection between the torsional profile and the trailing arms in the twist beam axle and corresponding orbiform according to FIG. 2.
Figure 3:
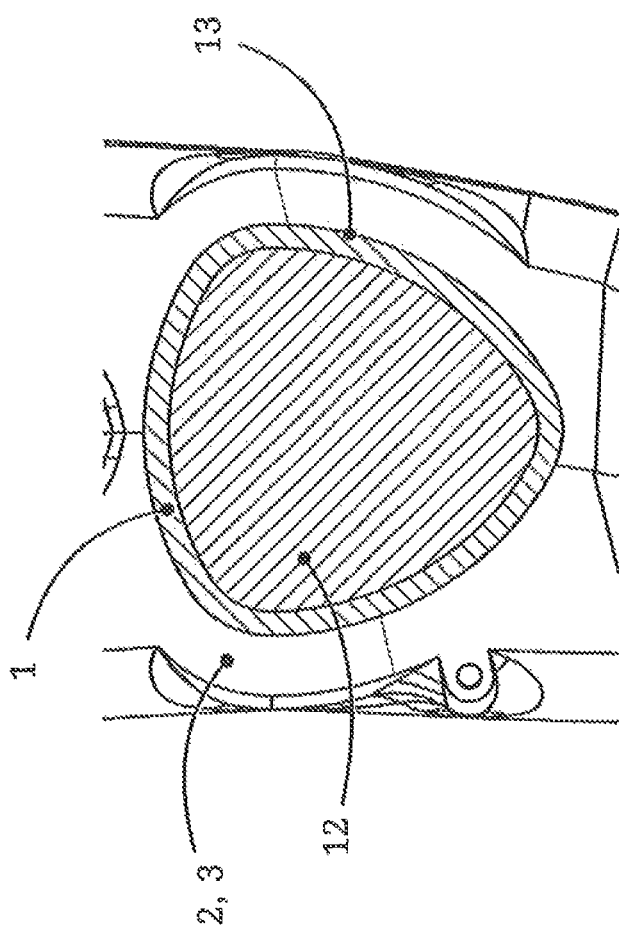

The form-locking connection between the trailing arms 2, 3 and the torsional profile 1 is shown in detail in the representation according to FIG. 3, which corresponds to a section of a side view of the twist beam axle as viewed along the longitudinal axle of the torsional profile 1. The torsional profile 1 and the press-fit plug 12 are shown with different shading in each of the representations according to FIGS. 3 to 6 merely to permit better differentiation (and not in the sense of cut surfaces).

It is clear that the recess 13 of the trailing arms 2, 3, the torsional profile 1, and the press-fit plug 12 each have a cross-sectional shape substantially corresponding to an orbiform in this case. An orbiform can inscribe an imaginary square, independently of the imaginary rotational position, such that all four sides of the square are touched from the inside at all times (see the illustration 14 in FIG. 3A); a vernier caliper would show the "same thickness" or the same "diameter" at every point of an orbiform. In the present case, an orbiform, as the cross-sectional shape of the torsional profile end section 1 and the trailing arm recess 13, is a particularly effective compromise between a polygon having a maximum form-locked connection but a high notch effect, and a circular cross-section without a form-locked connection and without a notch effect.

Figure 4:
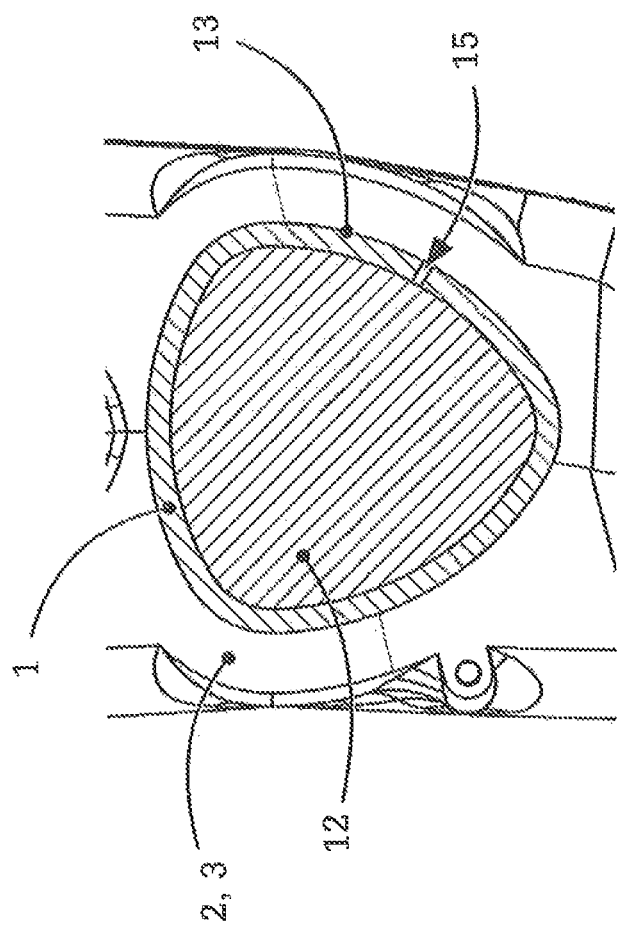
FIG. 4: shows, in a representation and view corresponding to FIG. 3, the region of connection between the torsional profile and the trailing arms in an embodiment of a twist beam axle having a slotted torsional profile.

The embodiment of the connection between the trailing arms 2, 3 and the torsional profile 1 according to FIG. 4 substantially corresponds to the embodiment according to FIG. 3, with the difference that the torsional profile 1 in the embodiment according to FIG. 4 is not a closed (welded, for example) tube profile, but rather is an open tube profile, which is clearly shown by the slot 15 according to FIG. 4, which extends in the axial direction of the torsional profile 1 (perpendicular to the plane of the drawing). As is clearly shown, even when torsional profiles 1 produced as open tube profiles are used, a fixed, form-locking connection is established between the torsional profile 1 and the trailing arms 2, 3, whereby additional cost advantages are obtained, in particular, since the torsional profile 1 can therefore be produced at lower cost.

Figure 5:
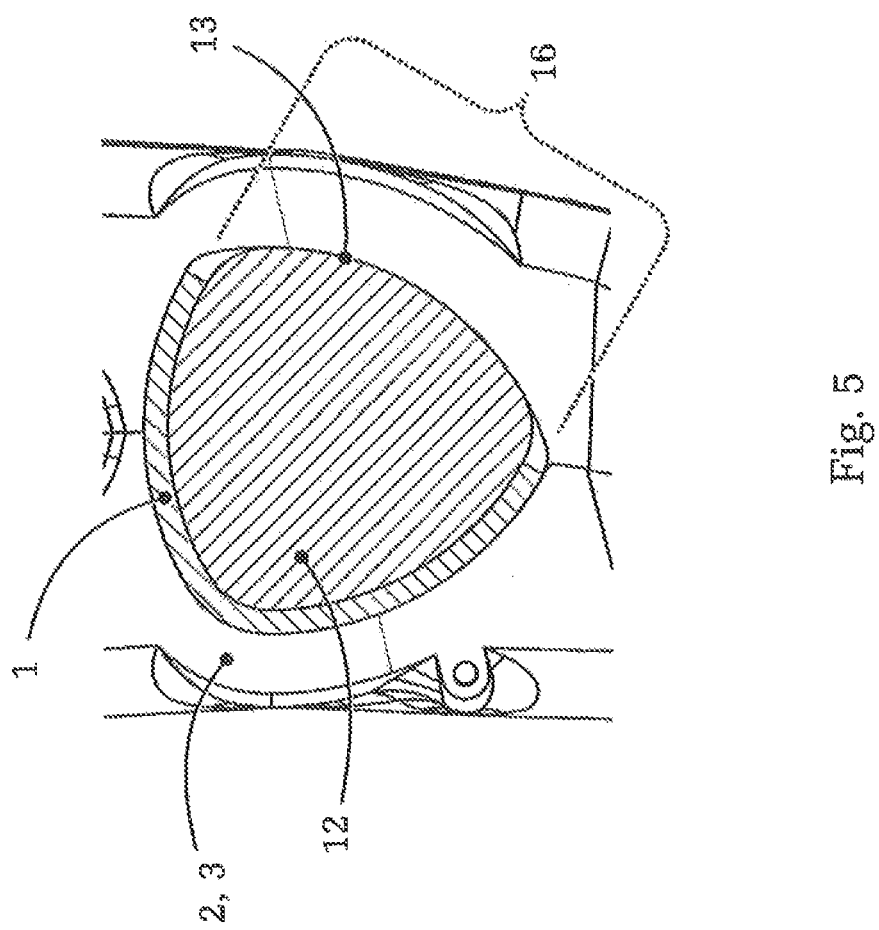
FIG. 5: shows, in a representation and view corresponding to FIGS. 3 and 4, the region of connection between the torsional profile and the trailing arms, in an embodiment of a twist beam axle having a torsional profile that is open on one side.
Figure 6:
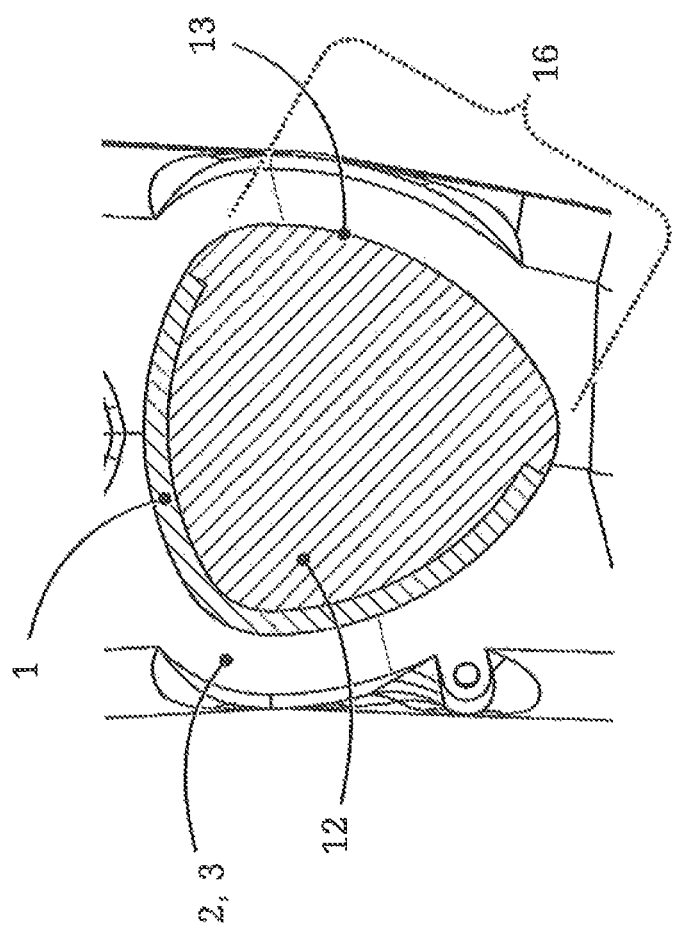
FIG. 6: shows, in a representation and view corresponding to FIGS. 3 to 5, the region of connection between the torsional profile and the trailing arms, in a further embodiment of a twist beam axle having an open torsional profile.

Further embodiments for the connection between the torsional profile 1 and the trailing arms 2, 3 of a twist beam axle are depicted in FIGS. 5 and 6. In the embodiments according to FIGS. 5 and 6, the torsional profile 1 in each case has a cross-sectional region 16 that is open along approximately one-third of the circumference thereof. In other words, the torsional profile 1 according to FIGS. 5 and 6 is a sheet-metal profile open in the shape of a "U" or "V", at least in the region of the end sections thereof. In both embodiments (according to FIG. 5 and according to FIG. 6), the press-fit plug 12 extends through, due to the open cross-sectional region 16 of the torsional profile 1, wherein this press-fit plug therefore bears, in each case, against the respective inner surface of the recess 13 (within the open cross-sectional region 16) and is supported there, and a fully form-locking enclosure of the torsional profile 1 between the press-fit plug 12 and the trailing arms 2, 3 results in each case.

Therefore, relatively torsionally weak, largely open, sheet-metal profiles can also be used for a twist beam axle, without creating difficulties in light of the required permanently form-locking connection between the trailing arms 2, 3 and the torsional profile 1.

In the embodiment according to FIG. 5, the recess 13 in the trailing arm 2, 3 is drawn inward, for this purpose, in the section of the open cross-sectional region 16 of the torsional profile 1 by the thickness, in each case, of the wall thickness (which is not present there) of the torsional profile 1, thereby making it possible to use a press-fit plug 12 designed as a symmetrical orbiform in this case as well (as in the embodiments according to FIGS. 3 and 4).

In the alternative embodiment according to FIG. 6, however, the press-fit plug is provided with a cross-sectional shape, such that the press-fit plug accommodates the torsional profile 1 completely in a form-locking manner, wherein the torsional profile 1 is open in the region 16 and is designed as a sheet-metal profile open in the shape of a "U" or "V". In this embodiment, the cross-sectional shape of the recess 13 of the trailing arm 2, 3 can therefore be similarly designed as a symmetrical orbiform (as in the embodiments according to FIGS. 3 and 4), while the press-fit plug takes on a drawn-in cross-sectional shape, which corresponds to the form-locking accommodation of the wall of the torsional profile 1.

Figure 7:
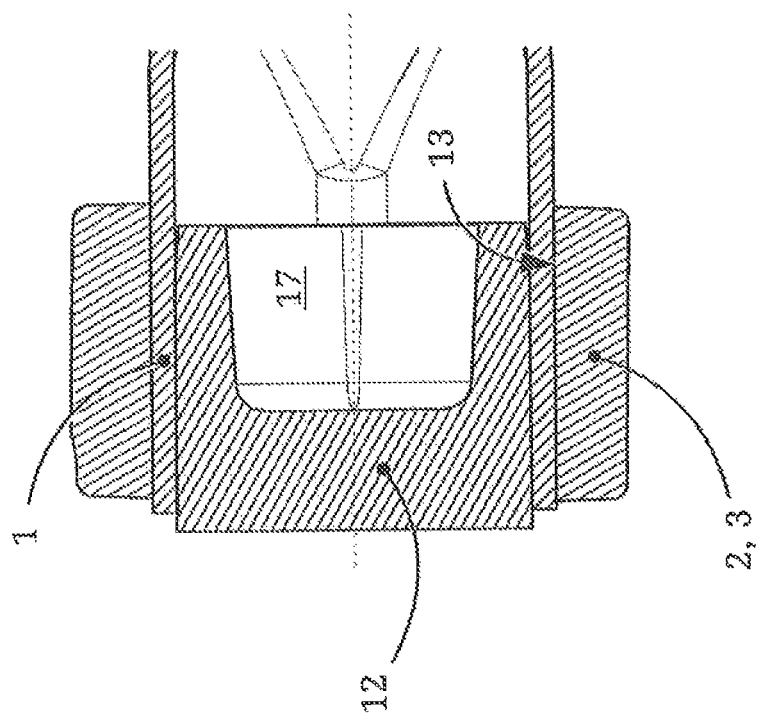
FIG. 7: shows the region of connection between the torsional profile and the trailing arms in the twist beam axle according to FIG. 2, in a longitudinal section.
Figure 8:
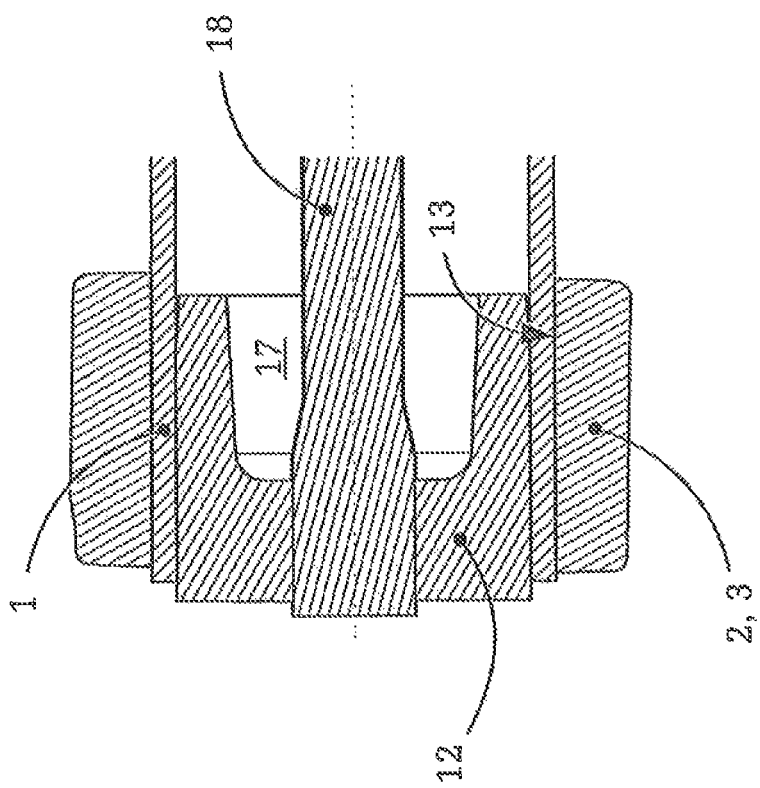
FIG. 8: shows, in a representation corresponding to FIG. 7, an embodiment of a twist beam axle having an additional torsion bar.

In FIGS. 7 and 8, the region of the connection between the torsional profile 1 and a trailing arm 2, 3, in a twist beam axle according to an embodiment of the present invention, is shown in a longitudinal section. Clearly shown is the end section of the torsional profile 1, which is disposed in the receiving recess 13 of the trailing arm 2, 3, wherein a press-fit plug 12 is pressed into the interior space of the torsional profile end section. The press-fit plug 12 is hollow in this case, or has a recess 17 in the axial direction. As a result, the press-fit plug 12 is provided with stiffness that diminishes in the direction of the torsional profile 1, whereby the abrupt change in stiffness and the notch effect associated therewith are reduced accordingly in the transition region between the trailing arms 2, 3 and the torsional profile 1, and the endurance limit of the connection between the torsional profile 1 and the trailing arms 2, 3 is increased accordingly.

The behavior of the embodiment according to FIG. 8 is similar, in which, however, a torsion bar 18 is additionally disposed in the interior space of the torsional profile 1. The torsion bar 18 is disposed in a recess of the press-fit plug 12 in a form-locking manner with respect to torsion (by means of groove toothing, for example). As a result, in the embodiment according to FIG. 8, the torsional stiffness and flexural rigidity of a thusly designed twist beam axle can be defined or changed largely independently of one another, for example by selecting a torsion bar 18 having a certain diameter and, therefore, a certain (greater or lesser) torsional stiffness in each case.

In summary, it is therefore clear that, due to the invention, a twist beam axle is created that ensures a permanently reliable transfer of high bending moments and torques between trailing arms and the torsional profile. Due to the invention, highly diverse materials can be used for the torsional profile and the trailing arms, and can be combined with one another. The twist beam axle according to the invention makes it possible, in particular, to use large-volume, thin-walled and, therefore, weight-saving torsional profiles. Finally, the invention makes it possible to lower costs in production and assembly, and to reduce the need for maintenance during operation.

Reference Characters 1 torsional profile, torsional profile end section
2, 3 trailing arm
4, 5 bearing lug
6, 7 spring receptacle
8, 9 wheel bearing receptacle
10, 11 connection region
12 press-fit plug
13 receiving recess
14 orbiform (illustration)
15 profile slot
16 open cross-sectional region
17 press-fit plug recess
18 torsion bar

The invention claimed is:

1. A twist beam axle for a wheel suspension of a motor vehicle, the twist beam axle comprising:
   first and second trailing arms (2, 3),
   a torsional profile (1) having end sections having a noncircular cross-section,
   the first trailing arm (2) is connected to a first end section of the torsional profile (1) while the second trailing arm (3) is connected to a second end section of the torsional profile (1), each of the first and the second end sections of the torsional profile has an opening that extends in an axial direction of the torsional profile to form an open tube profile,
   the first trailing arm (2) having a receiving recess (13) with a noncircular cross-sectional shape corresponding to that of an outer surface of the first end section of the torsional profile (1) and the second trailing arm (3) having a receiving recess (13) with a noncircular cross-section shape corresponding to that of an outer surface of the second end section of the torsional profile (1), and
   a respective press-fit plug (12) being disposed in an interior space of each end section of the torsional profile (1) for achieving a press fit connection between the outer surface of the respective end section (1) and the receiving recess (13) of the respective trailing arm (2, 3).

2. The twist beam axle according to claim 1, wherein the trailing arms (2, 3) and the torsional profile (1) are made of different materials.

3. The twist beam axle according to claim 1, wherein a trailing arm receiving recess (13) and the torsional profile end section (1) each have a polygonal cross-sectional shape and rounded corners.

4. The twist beam axle according to claim 1, wherein the cross-sectional shape of the receiving recess (13) and the end section of the torsional profile (1) corresponds to an orbiform (14).

5. The twist beam axle according to claim 1, wherein the cross-sectional shape of the press-fit plug (12) is designed to have a shape corresponding to the inner cross-sectional shape of the end section of the torsional profile (1).

6. The twist beam axle according to claim 1, wherein the torsional profile (1) comprises a slot (15) extending in an axial direction, at least in a region of the end sections thereof.

7. The twist beam axle according to claim 1, wherein the torsional profile (1) has, at least in regions of the end sections thereof, a cross-sectional region (16) that is open along a portion of a circumference thereof, the press-fit plug (12), after installation, extends through the open cross-sectional region (16) via a sub-region of the outer circumference thereof, comes to bear against the receiving recess (13) of the trailing arm (2, 3).

8. The twist beam axle according to claim 1, wherein the torsional profile (1) has, at least in a region of the end sections thereof, either an axial slot (15) or an open cross-sectional region (16), and the press-fit plug (12), after installation, fills the slot (15) or the open cross-sectional region (16) in a form-locking manner, comes to bear against the receiving recess of the trailing arm (2, 3).

9. The twist beam axle according to claim 1, wherein the press-fit plug (12) and the receiving recess (13) taper, slightly conically, along an axial direction of the torsional profile (1).

10. The twist beam axle according to claim 1, wherein the press-fit plug (12) is either hollow or comprises a recess (17) along an axial direction thereof.

11. The twist beam axle according to claim 1, wherein a torsion bar (18) is disposed in the interior space of the torsion profile (1), and opposed ends of the torsion bar (18) are connected to the press-fit plug (12).

12. The twist beam axle according to claim 1, wherein the press-fit plug (12) is substantially entirely secured in the interior space of the torsional profile end section (1) via the press-fit connection.

13. The twist beam axle according to claim 1, wherein the torsional profile end section (1) is substantially entirely secured to the receiving recess (13) of the trailing arm (2, 3) via the press-fit connection.

14. The twist beam axle according to claim 1, wherein the first trailing arm (2) comprises an elongate arm which has opposed first and second ends, and the receiving recess (13) is centrally located along the first trailing arm (2), and
   the second trailing arm (3) comprises an elongate arm which has opposed first and second ends, and the receiving recess (13) is centrally located along the second trailing arm (3).

15. The twist beam axle according to claim 14, wherein each of the first and the second trailing arms (2, 3) supports a bearing lug (4, 5), adjacent the first end thereof, for accommodating an elastomeric bearing to facilitate connection of the twist beam axle to a vehicle chassis or body, and supports a spring recess (6, 7), adjacent the second end thereof, for supporting a chassis spring,
   the torsional profile (1) is connected to the first trailing arm (2) at a location between the bearing lug (4) and the spring recess (6), and
   the torsional profile (1) is connected to the second trailing arm (3) at a location between the bearing lug (5) and the spring recess (7).

16. The twist beam axle according to claim 14, wherein each of the first and the second trailing arms (2, 3) supports a bearing lug (4, 5), adjacent the first end thereof, for accommodating an elastomeric bearing to facilitate connection of the twist beam axle to a vehicle chassis or body, and supports a spring recess (6, 7), adjacent the second end thereof, for supporting a chassis spring and a bearing recess (8, 9), for supporting a wheel bearing,
   the torsional profile (1) is connected to the first trailing arm (2) at a location between the bearing lug (4) and the spring recess (6), and
   the torsional profile (1) is connected to the second trailing arm (3) at a location between the bearing lug (5) and the spring recess (7).

17. A twist beam axle for a wheel suspension of a motor vehicle, the twist beam axle comprising:
   two trailing arms, each of the two trailing arms having a centrally located receiving recess and bearing lug recess adjacent one end thereof and a spring recess adjacent an opposite end thereof;
   a torsional profile having opposed axial ends, the axial ends of the torsional profile have a noncircular transverse cross section and radially inner and outer surfaces, the inner surface of the axial ends of the torsional profile define an interior space, the axial ends of the torsional profile each have an open tube profile formed by an opening that extends axially along the respective axial end;
   the receiving recesses of the trailing arms having a shape that corresponds to the noncircular cross sections of the opposite axial ends of the torsional profile, such that the outer surfaces of the axial ends are received within and mate with the receiving recess of the trailing arms; and
   a respective plug being press-fit within the interior spaces of the axial ends of the torsional profile and engage with the inner surfaces of the axial ends of the torsional profile so as to apply a pressing force on the axial ends of the torsional profile and positively lock the torsional profile to the two trailing arms.

18. A twist beam axle for a wheel suspension of a motor vehicle, the twist beam axle comprising:
first and second trailing arms,
a torsional profile (1) with opposed first and second noncircular cross-sectional end sections, each of the first and the second noncircular cross-sectional end sections has either an axially extending slot or an open cross-sectional region,
the first trailing arm (2) having a receiving recess (13) with a shape corresponding to that of an outer surface of the first noncircular cross-sectional end section,
the second trailing arm (3) having a receiving recess (13) with a shape corresponding to that of an outer surface of the second noncircular cross-sectional end section,
the first trailing arm (2) being connected to the first noncircular cross-sectional end section of the torsional profile (1) while the second trailing arm (3) being connected to the second noncircular cross-sectional end section of the torsional profile (1), and
a respective press-fit plug (12) being disposed within an interior space of each of the first and the second noncircular cross-sectional end sections of the torsional profile (1) for securing the torsional profile (1) to the first and the second trailing arms (2, 3) by a press fit connection.

* * * * *